(12) United States Patent
Lin et al.

(10) Patent No.: US 11,340,779 B2
(45) Date of Patent: May 24, 2022

(54) TOUCH SYSTEM WITH HANDWRITING FUNCTION AND OPERATION METHOD THEREOF

(71) Applicants: MICRO-STAR INT'L CO., LTD., New Taipei (TW); MSI ELECTRONIC (KUN SHAN) CO., LTD., Kunshan (CN)

(72) Inventors: Min-Hung Lin, New Taipei (TW); Hsien-Lin Hu, New Taipei (TW)

(73) Assignees: MICRO-STAR INT'L CO., LTD., New Taipei (TW); MSI ELECTRONIC (KUN SHAN) CO., LTD., Kunshan (CN)

( * ) Notice: Subject to any disclaimer, the term of this patent is extended or adjusted under 35 U.S.C. 154(b) by 0 days.

(21) Appl. No.: 17/229,563

(22) Filed: Apr. 13, 2021

(65) Prior Publication Data

US 2021/0349628 A1 Nov. 11, 2021

(30) Foreign Application Priority Data

May 6, 2020 (TW) .................................. 109114987

(51) Int. Cl.
*G06F 3/04883* (2022.01)
*G06F 3/041* (2006.01)

(52) U.S. Cl.
CPC ........ *G06F 3/04883* (2013.01); *G06F 3/0412* (2013.01); *G06F 2203/04808* (2013.01)

(58) Field of Classification Search
CPC ............ G06F 3/03545; G06F 3/04883; G06F 3/0412; G06F 2203/04808
See application file for complete search history.

(56) References Cited

U.S. PATENT DOCUMENTS

| 2020/0081552 A1* | 3/2020 | Gur ....................... G06F 3/0416 |
| 2020/0174639 A1* | 6/2020 | Sun .................... G06F 3/03545 |
| 2021/0048934 A1* | 2/2021 | Van Ostrand ......... G06F 3/0393 |

* cited by examiner

*Primary Examiner* — Peter D McLoone
(74) *Attorney, Agent, or Firm* — Maschoff Brennan (57) ABSTRACT

An operation method of touch system with handwriting function which comprises a stylus device and a touchpad, wherein a surface of the touchpad is divided into a function area and a writing area, and the operation method comprises: sending a beacon signal by the stylus device, receiving the beacon signal by touchpad, emitting a first light toward a pattern locating in the functional area of the surface of the touchpad by a light emitting element of a light emitting layer of the touchpad when signal strength of the beacon signal is bigger than a threshold, identifying, by the touchpad, a touched position on the surface when the touchpad is touched, changing the first light emitted to the pattern to a second light by the light emitting element and generating and outputting a control signal by the touchpad when the touched position falls in the pattern.

10 Claims, 5 Drawing Sheets

TOUCH SYSTEM WITH HANDWRITING FUNCTION AND OPERATION METHOD THEREOF

CROSS-REFERENCE TO RELATED APPLICATIONS

This non-provisional application claims priority under 35 U.S.C. § 119(a) on Patent Application No(s). 109114987 filed in Republic of China (ROC) on May 6, 2020, the entire contents of which are hereby incorporated by reference.

BACKGROUND

1. Technical Field

This disclosure relates to a touch system and operating method thereof, particularly to a touch system with handwriting function and operating method thereof.

2. Related Art

Most laptops on the market are equipped with a touchpad as an input device allowing users to operate the laptop normally without additional devices such as a mouse. There is also touchpad on the market that needs to be used with a stylus. Consumers can purchase the touchpad and the stylus for different purposes such as drawing, electronic signature authentication, chatting, and general input commands. The above-mentioned purposes can also be achieved by connecting the touchpad to a laptop. Some of the professional drawing boards have screen display function and can be directly drawn on.

However, the manufacturing cost of a professional drawing board is relatively high for a laptop, and a customer may not have a necessary need to purchase the drawing board. On the research and development side of computer companies, there is no need to incorporate expensive drawing board when developing a new laptop, especially for low-priced and medium-priced products.

SUMMARY

Accordingly, the present disclosure provides a touch system with a switchable function and an operating method thereof that meets the above requirements.

According to one embodiment of the present disclosure, an operation method of touch system with handwriting function, adapted to a touch system comprising a stylus device and a touchpad, wherein a surface of the touchpad is divided into a functional area and a writing area not overlapping with each other, the functional area has a coordinate set, and the operation method of touch system with handwriting function comprises sending a beacon signal by the stylus device, receiving the beacon signal by the touchpad, emitting a first light with a first optical characteristic toward the surface by a light emitting element in a light emitting layer of the touchpad when signal strength of the beacon signal received by the touchpad is greater than a threshold, wherein the first light penetrates a pattern which is light-permeable of the light emitting layer, and an orthographic projection of the pattern on the surface overlaps the coordinate set, identifying, by the touchpad, a touched position on the surface when the touchpad is touched, and when the touched position falls in the coordinate set, changing the first light emitted to the pattern by the light emitting element into a second light having a second optical characteristic, and generating and outputting a control signal related to the coordinate set by the touchpad.

According to one embodiment of the present disclosure, an operation method of touch system with handwriting function, adapted to a touch system comprising a stylus device and a touchpad, wherein a surface of the touchpad has a plurality of candidate functional areas, each of the plurality of candidate functional areas has a coordinate set, and the operation method of touch system with handwriting function comprises sending a beacon signal by the stylus device, receiving the beacon signal by the touchpad, selecting one of the plurality of candidate functional areas as a functional area according to a switching signal by the touchpad, dividing the surface of the touchpad into the functional area and a writing area which are not overlapping with each other when signal strength of the beacon signal received by the touchpad is greater than a threshold, identifying, by the touchpad, a touched position on the surface when the touchpad is touched, and generating and outputting a control signal related to the coordinate set by the touchpad, when the touched position falls in the coordinate set of the functional area.

According to one embodiment of the present disclosure, an touch system comprises a stylus device configured to output a beacon signal, and a touchpad in communication connection with the stylus device, wherein the touchpad comprises a light emitting layer, the light emitting layer comprises a light emitting element, a surface of the touchpad is divided into a functional area and a writing area not overlapping with each other, wherein the functional area has a coordinate set, a surface of the light emitting layer has a pattern which is light-permeable, an orthographic projection of the pattern on a surface of the touchpad overlaps the coordinate set, wherein when signal strength of the beacon signal received by the touchpad is greater than a threshold, the light-emitting element emits a first light with a first optical characteristic toward the surface of the touchpad, the first light penetrates the pattern, and when the touchpad identifies a touched position being pressed falls in the coordinate set, the touchpad changes the first light emitted to the pattern by the light-emitting element into a second light having a second optical characteristic, and generates and outputs a control signal related to the coordinate set.

In the view of the above description the touch system with handwriting function and operating method thereof according to the present disclosure provide a touch system integrating general finger touch function and stylus function. When the touchpad of the touch system receives the beacon signal emitted by the stylus device, the surface of the touchpad is divided into the functional area and the writing area. Moreover, when the selected pattern of the functional area is touched, the touchpad generates and outputs the control signal corresponding to the selected pattern. According to the above description, the present disclosure allows users to use a touch system with both the handwriting mode and touch mode with a lower cost.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
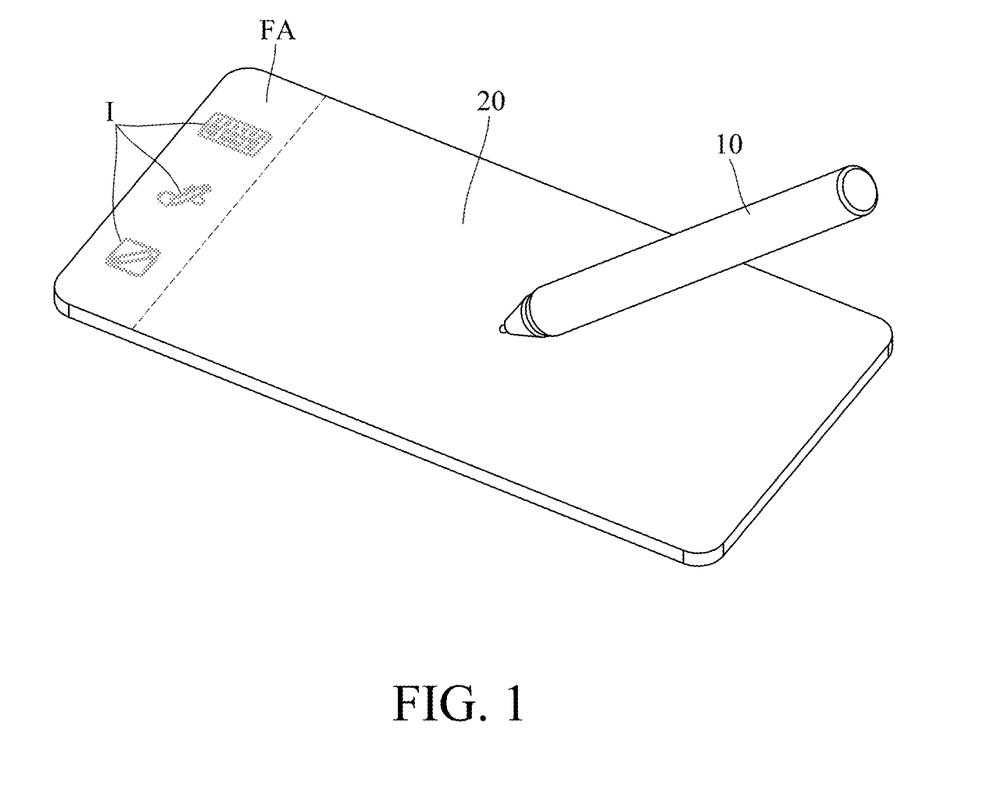
FIG. 1 is a component diagram of the touch system with handwriting function according to a first embodiment of the present disclosure.

Please refer to FIG. 1, wherein FIG. 1 is a component diagram of the touch system with handwriting function according to a first embodiment of the present disclosure. The touch system with handwriting function comprises a stylus device 10 and a touchpad 20. The touch system with handwriting function in an embodiment of the present disclosure needs to utilize a Human Interface Device (HID) communication protocol. Moreover, the beacon signal emitted by the stylus device 10 needs to meet the conditions allowed by the protocol, such as specific frequency bands, etc.

In detail, the touchpad 20 has the function of general finger touch operation. More particularly, the touchpad 20 may further have handwriting function after receiving the beacon signal emitted by the stylus device 10. The definition of "handwriting" is utilizing the stylus device 10 to operate the touchpad 20. In the present embodiment, the entire surface area of the touchpad 20 may all be operated in a touch mode when the touchpad 20 does not receive the beacon signal. After the touchpad 20 receives the beacon signal with signal strength greater than a threshold and transforms into the handwriting mode correspondingly, the surface of the touchpad 20 is divided into a functional area FA and a writing area which are not overlapping with each other. The "division" does not mean the areas are divided by an actual solid line, but divided according to the different applications of each area. Besides, the "division" is not limited to dividing the above surface into the above two areas. The surface of the touchpad 20 may also be divided into another area, the present disclosure does not limit the divided area of the surface of the touchpad 20. The touchpad 20 has a light emitting layer underneath its light-permeable surface. The light emitting layer has a plurality of light emitting elements. Further, the surface of the light emitting layer has a plurality of patterns I that are light-permeable and not overlapping with each other, wherein the light emitting elements are a plurality of light-emitting diodes (LED) in the present embodiment, and the orthographic projections of the patterns I on the surface of the touchpad 20 are located in the functional area FA and respectively overlap a plurality of predetermined coordinate sets. The present disclosure does not limit the appearance of the coordinate sets and the sizes of the coordinate sets with respect to the patterns I. Each pattern I corresponds to a coordinate set. An area occupied by any pattern may be larger than an area of the corresponding coordinate set or smaller than the corresponding coordinate set. Although FIG. 1 shows that the functional area FA has a plurality of patterns I, the light emitting layer of the touchpad 20 of the first embodiment of the present disclosure may also have only one light emitting element and one pattern I. In this circumstance, there is only one coordinate set. The patterns I can be complex figures directly corresponding to different functions or applications, or simple geometric figures The actual figures of the patterns I are not restricted by bounded functions or apps, the present disclosure does not limit the figures of patterns I. The touchpad 20 receives the beacon signal. A position on the touchpad 20 is identified when the touchpad 20 is touched (the touchpad 20 may identify the touched position by sensing a change in capacitance of a capacitor disposed in the touchpad 20). The operation of the touchpad 20 in the first embodiment of the present disclosure will be described in detail in the following description.

Figure 2:
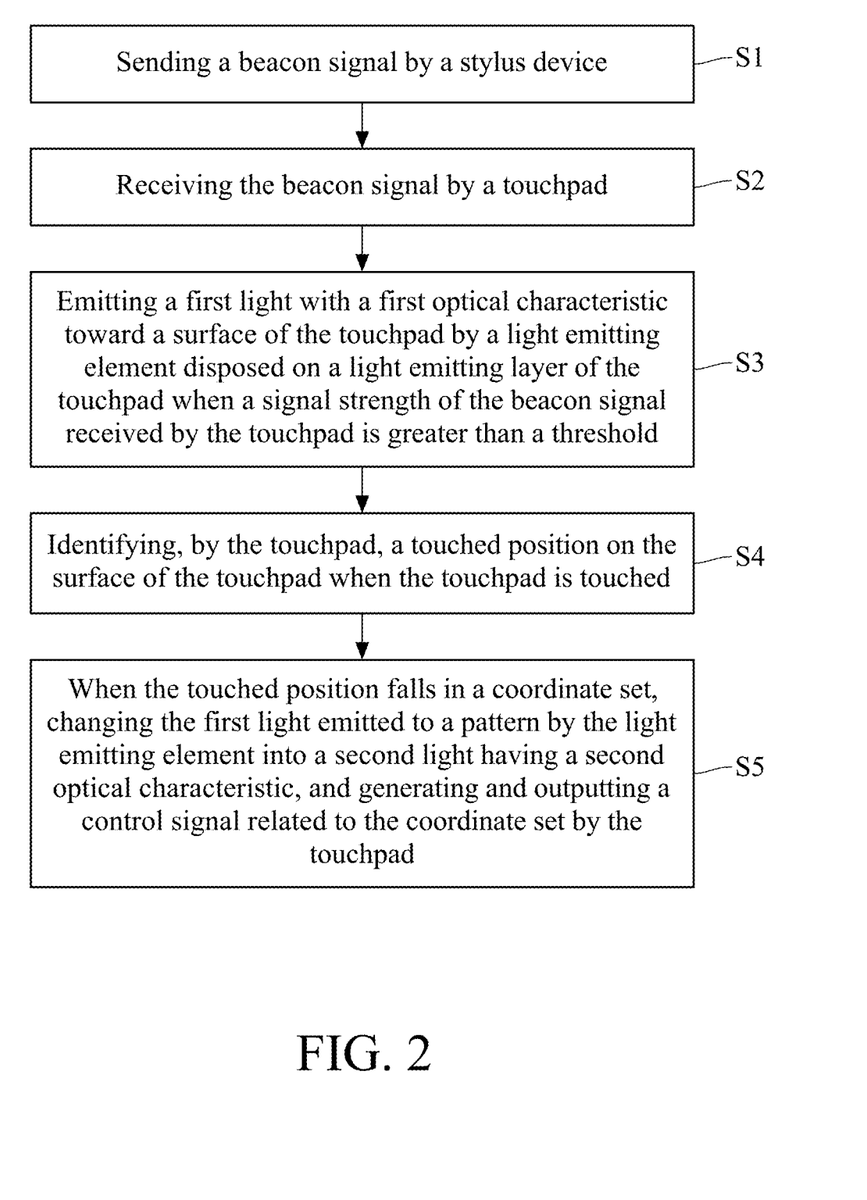
FIG. 2 is a flowchart of the operation method of touch system with handwriting function according to the first embodiment of the present disclosure.

Please refer to FIG. 2, wherein FIG. 2 is a flowchart of the operation method of touch system with handwriting function according to the first embodiment of the present disclosure. Please refer to step S1: sending a beacon signal by the stylus device 10. The stylus device 10 may be provided with a power switch, and the beacon signal is sent when the power switch is turned on.

Please refer to step S2: receiving the beacon signal from the stylus 10 by the touchpad 20.

Figure 3:
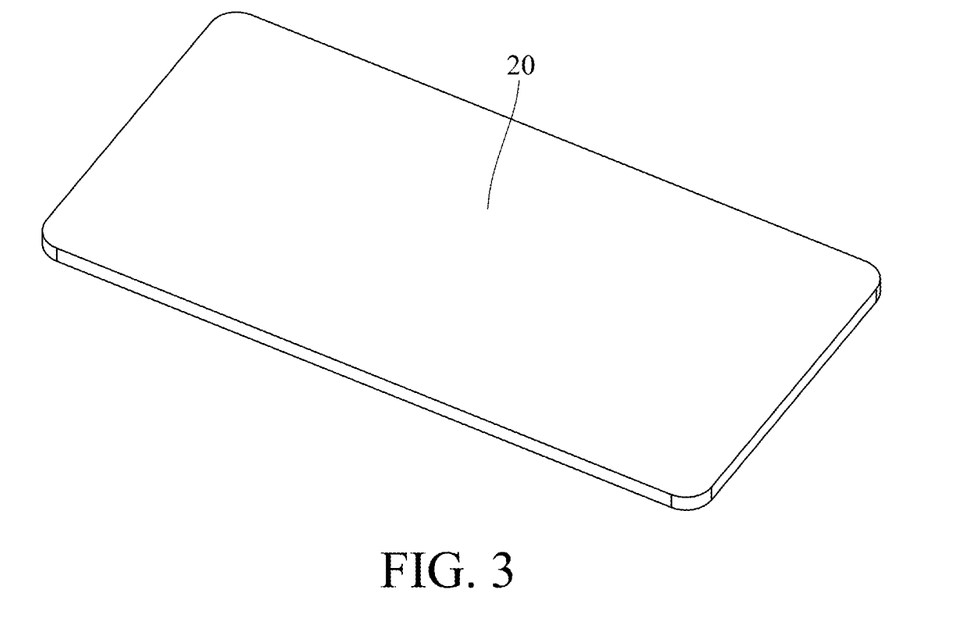
FIG. 3 is a schematic diagram showing that the touchpad of the first embodiment of the present disclosure not receiving a beacon signal.
Figure 4:
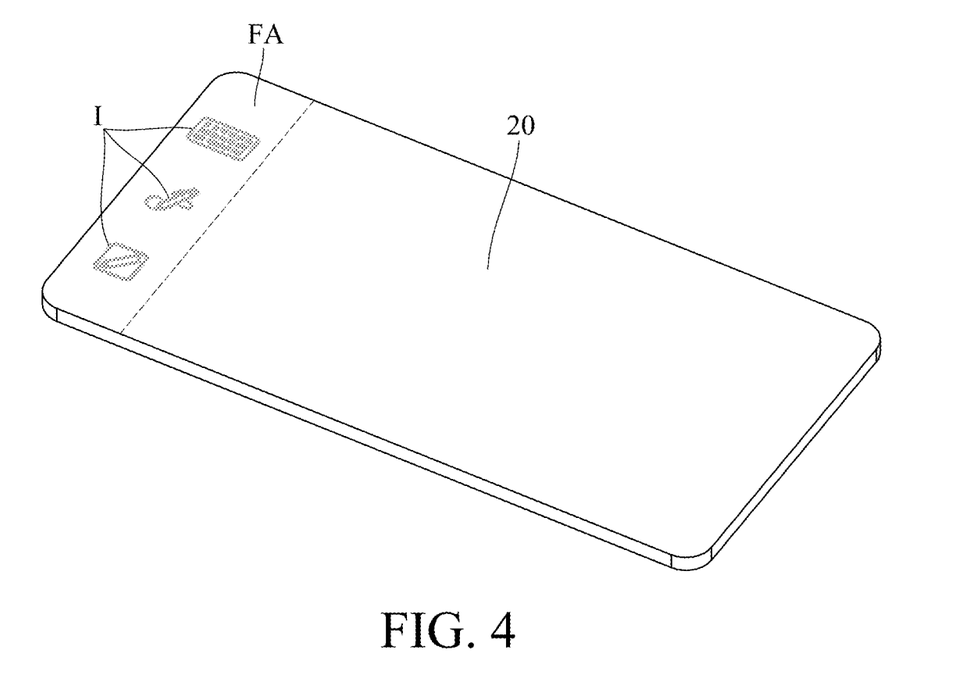
FIG. 4 is a schematic diagram of a first light emitted by a light-emitting element of the first embodiment of the present disclosure.

Please refer to step S3: emitting a first light with a first optical characteristic toward the surface of the touchpad 20 by a light emitting element disposed on a light emitting layer of the touchpad 20 when the signal strength of the beacon signal received by the touchpad 20 is greater than a threshold, wherein the first light penetrates the patterns I. The threshold can be set according to requirements for the touchpad 20 transforming into the handwriting mode as soon as the beacon signal is sent, or for the touchpad 20 transforming into the handwriting mode when the stylus device 10 is within a certain distance from the touchpad 20. Please refer to FIG. 3 and FIG. 4, wherein FIG. 3 shows that the touchpad 20 does not operate when the signal strength of the beacon signal received by the touchpad 20 is less than the threshold, and FIG. 4 shows that when the signal strength of the beacon signal received by the touchpad 20 is greater than the threshold, the surface of the touchpad 20 is divided into the aforementioned functional area FA and writing area. The light emitting element emits a first light having a first optical characteristic to the pattern I, and the first light travels to the surface of the touchpad 20 through the light-permeable pattern I. The pattern I then may be seen from the outside appearing in the functional area FA locating on the surface of the touchpad 20. As shown in FIG. 4, the dotted line next to the functional area FA in FIG. 4 is used to better understand that the touchpad 20 is divided into the functional area FA and the writing area, the dotted line may be omitted in practice.

Further, when the touchpad 20 transforms into the handwriting mode, a floating operation can be performed. When the signal strength of the beacon signal received by the touchpad 20 is greater than the threshold, especially when a distance between the stylus device 10 and the touchpad 20 is less than a predetermined distance, the touchpad 20 may identify a floating position on its surface with a strongest signal corresponding to the beacon signal and generate a floating coordinate information according to the beacon signal. The floating coordinate information may be used to determine where the floating position is on the touchpad 20. When the floating position falls in the writing area, the touchpad 20 generates and outputs the floating coordinate information. If the touch system with handwriting function in the first embodiment of the present disclosure is connected to an electronic device, such as a laptop, a coordinate on the writing area corresponds to the absolute coordinate on the screen of the laptop, wherein the floating coordinate information is used to control the cursor of the laptop or show the pattern of the absolute coordinate corresponding to the floating coordinate information, the present disclosure is not limited there.

Please refer to step S4: identifying, by the touchpad, a touched position on the surface of the touchpad 2 when the touchpad is touched. In detail, when the touchpad 20 transforms into the handwriting mode and is further touched, the touched position on the surface of the touchpad 20 is identified.

Figure 5:
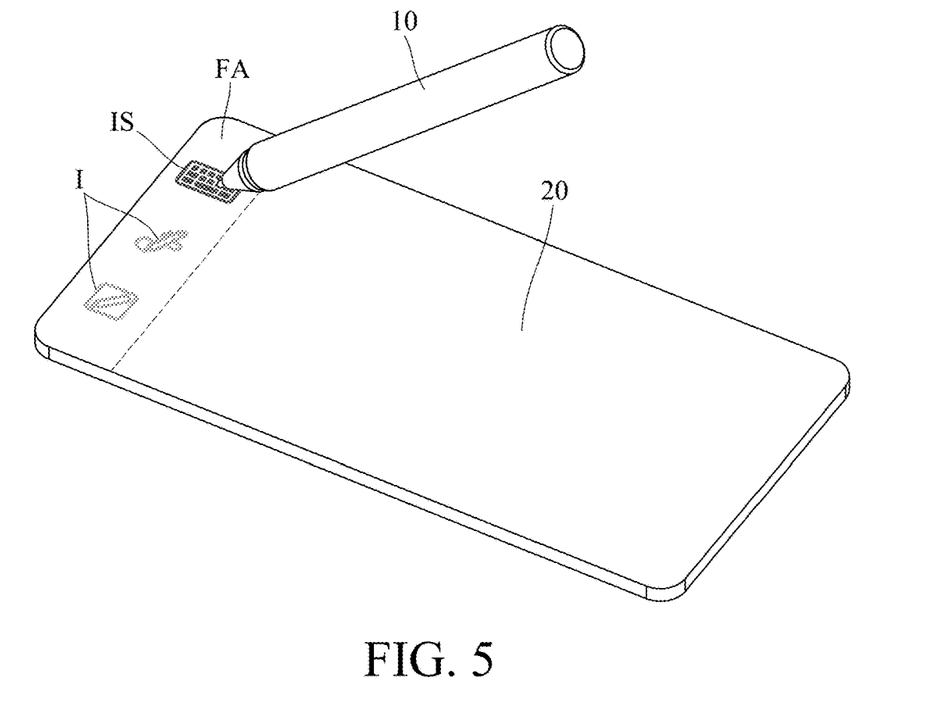
FIG. 5 is a schematic diagram of a second light emitted by the light-emitting element of the first embodiment of the present disclosure.

Please refer to FIG. 5 and step S5: when the touched position falls in the coordinate set corresponding to a selected pattern IS, changing the first light emitted to the selected pattern IS corresponding to the coordinate set by the light emitting element into a second light having a second optical characteristic, and generating and outputting a control signal related to the coordinate set by the touchpad 20. When the touched position on the touchpad 20 falls in one of the coordinate sets corresponding to one of the patterns I, the coordinate set is defined as the coordinate set corresponding to the selected pattern IS. Moreover, the touchpad 20 drives the light emitting element to change the first light emitted to the selected pattern IS into the second light having the second optical characteristic, and generates and outputs the control signal related to the coordinate set. The first light and the second light each has different optical characteristic, such as the frequency and intensity of the light, etc. In a condition where the light emitting layer has only one pattern I and one light emitting element and the touchpad 20 has only one coordinate set, when the touched position falls in the coordinate set corresponding to the pattern I, the pattern I is the selected pattern IS. The control signal may comprise the parameter indicating the coordinate set. If the touch system with handwriting function in the first embodiment of the present disclosure connects to an electronic device, the electronic device may identify the control signal and call the function corresponding to the parameter, such as activating an application, etc., wherein the function corresponding to the parameter may be modified through programming, the present disclosure does not limit the function corresponding to the parameter.

Figure 6:
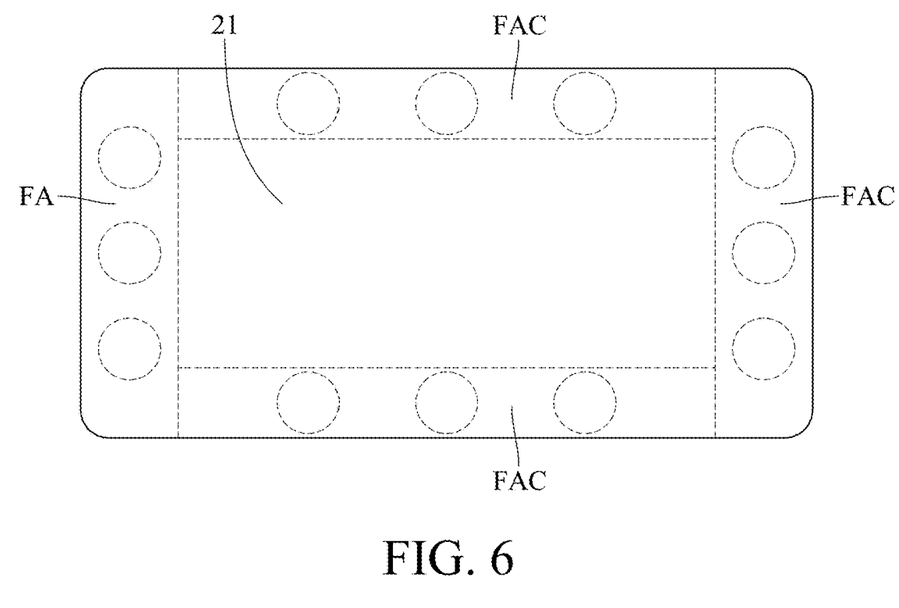
FIG. 6 is a schematic diagram of switching a plurality of candidate functional areas of a second embodiment of the present disclosure.

The first embodiment of the present disclosure is related to when the touchpad 20 receives the beacon signal emitted from the stylus device 10 and the pattern of the functional area is touched, generating the first light and the second light respectively in the functional area and generating and outputting the control signal by the touchpad 20. In comparison, the present disclosure further provides a second embodiment. As shown in FIG. 6, the touchpad 21 may select one candidate functional area FAC from the plurality of candidate functional areas FAC as a functional area FA according to a switching signal. In addition, when the touchpad 21 receives a beacon signal emitted from the stylus device 10, the touchpad 21 is divided into the functional area FA and a writing area. When a touched position on the surface of the touchpad 21 falls in a coordinate set, the touchpad 21 generates and outputs a control signal related to the coordinate set. The operation method of touch system with handwriting function in the second embodiment of the present disclosure is described below.

The stylus device 10 of the second embodiment of the present disclosure is as the same as the stylus device 10 in the first embodiment, the stylus device 10 are not be described repeatedly herein.

Please refer to FIG. 6. The surface of the touchpad 21 of the second embodiment of the present disclosure has the plurality of candidate functional areas FAC respectively occupying a certain area on the surface of the touchpad 21. As shown in the dotted circles in the candidate functional areas FAC in FIG. 6, the candidate functional area FAC has the plurality of predetermined coordinate sets not overlapping with each other. However, the present disclosure does not limit the shapes and the number of the coordinate sets, the dotted line may be omitted in practice. Similarly, the dotted lines next to the candidate functional areas FAC are used to better understand the candidate functional areas FAC divided from the touchpad 21 in FIG. 6, the dotted line may be omitted in practice. The touchpad 21 has the function of general finger touch operation and may further have handwriting function after receiving the beacon signal emitted from the stylus device 10. In the condition where the touchpad 21 of the present embodiment does not receive the beacon signal, the entire surface of the touchpad 21 may be operated by touch. Moreover, after the touchpad 21 receives the beacon signal with signal strength greater than a threshold and transforms into the handwriting mode, the touchpad 21 selects one of the candidate functional areas FAC as a functional area FA according to a switching signal and the touchpad 21 is divided into the functional area FA and a writing area. At this time, the writing area contains the remaining candidate functional areas FAC. The "division" does not mean the areas are divided by an actual solid line, but divided according to the different application of each area. Besides, the "division" is not limited to dividing the above surface into the above two areas. The surface of the touchpad 21 may also be divided into another area, the present disclosure does not limit the divided area of the surface of the touchpad 20. The switching signal may be from an electronic device electrically connected to the touchpad 21, or from a storage unit of the printed circuit board disposed in the touchpad 21. The switching signal may also be from a switching component electrically connected to the touchpad 21, the present disclosure does not limit the origin of the switching signal. When the touchpad 21 receives the beacon signal as well as when the touchpad 21 is touched, a touched position on the touchpad 21 is identified. When the touched position falls in a coordinate set, equivalent to when the user presses/touches the selected pattern IS corresponding to the coordinate set, the touchpad 21 generates and outputs a control signal related to the coordinate set. The following description is based on the candidate functional area FAC having the plurality of coordinate sets. However, each of the candidate functional areas FAC of the second embodiment of the present disclosure may also has only one coordinate set.

Figure 7:
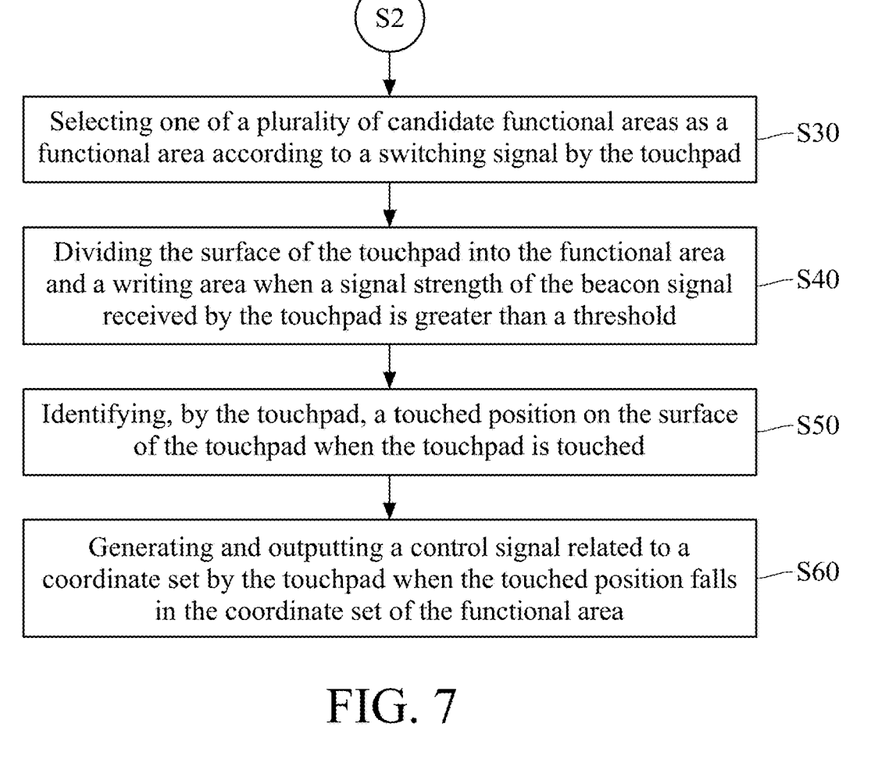
FIG. 7 is a flowchart of the operation method of the touch system with handwriting function according to the second embodiment of the present disclosure.

Please refer to FIG. 7. FIG. 7 shows the flowchart of the touch system with hand writing function of the second embodiment of the present disclosure. The second embodiment of the present disclosure includes steps S1, S2, S30, S40, S50 and S60, wherein steps S1 and S2 of the second embodiment are the same as steps S1 and S2 of the first embodiment, steps S1 and S2 are not described repeatedly herein.

Please refer to step S30: selecting one of the plurality of candidate functional areas FAC as a functional area FA according to a switching signal by the touchpad 21. This step may be selecting a functional area FA from any of the candidate functional areas FAC by default, or functional area FA may also be defined by the user.

Please refer to step S40: when the beacon signal is greater than a threshold, dividing the touchpad 21 into the functional area FA and the writing area. The threshold may be set according to requirements for the touchpad 20 transforming into the handwriting mode as soon as the beacon signal is sent, or for the touchpad 20 transforming into the handwriting mode when the stylus device 10 is within a certain distance from the touchpad 21, wherein after the functional area FA is selected in step S30 and the writing area is divided from the touchpad 21 in step S40, the remaining candidate functional areas FAC are equivalent to the writing area before the functional area FA is reselected.

In addition, after the touchpad 21 transforms into the handwriting mode, a floating operation may be performed. The description of the floating operation has been described in the first embodiment except that the touchpad 21 is different from the touchpad 20, the floating operation is not described repeatedly herein.

Please refer to step S50: identifying a touched position on the surface of the touchpad 21 when the touchpad 21 is touched. The detail description of step S50 is same as the description in the previous paragraph, step S50 is not described repeatedly herein.

Please refer to step S60: when the touched position falls in the coordinate set, generating and outputting a control signal related to the coordinate set by the touchpad 21. The control signal may comprise the parameter indicating the coordinate set. If the touch system with handwriting function in the second embodiment of the present disclosure connects to an electronic device, the electronic device may identify the control signal and call the function corresponding to the parameter, such as activating an application, etc., wherein the function corresponding to the parameter may be modified through programming, the present disclosure does not limit the function corresponding to the parameter.

Figure 8:
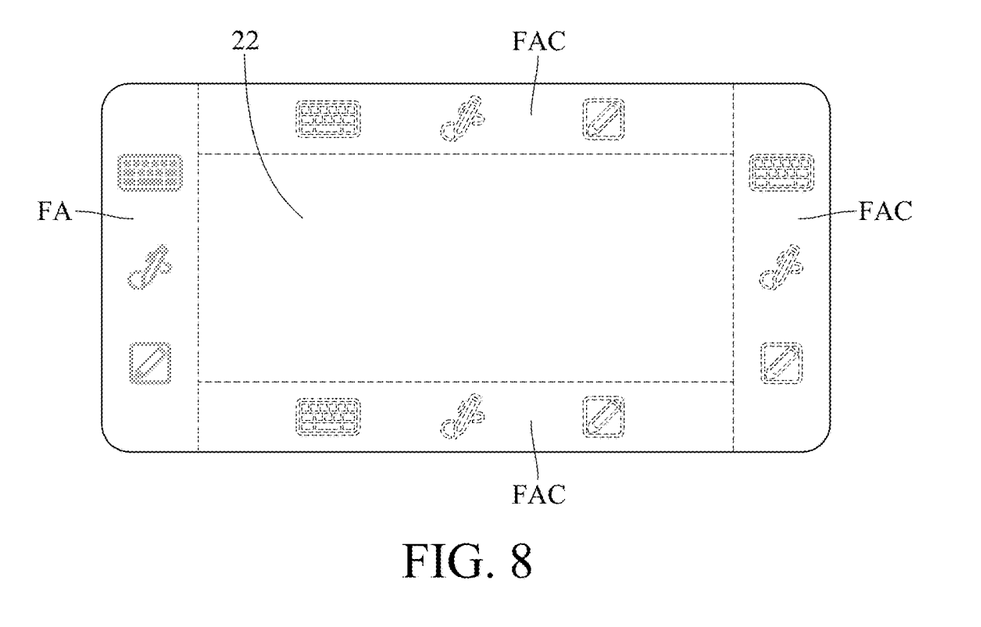
FIG. 8 is a schematic diagram of the touch system with handwriting function according to a third embodiment of the present disclosure.

The third embodiment includes both the light emitting function of the first embodiment and the selection of the functional area FA of the second embodiment. Please refer to FIG. 8. The touchpad 22 of the third embodiment of the present disclosure is the same as the touchpad 20 of the first embodiment having a light emitting layer and components associated with the light emitting layer, such as the plurality of light emitting elements and the plurality of patterns I, etc., and is also the same as the touchpad 21 of the second embodiment having the plurality of candidate functional areas FAC and the plurality of coordinate sets associated with the candidate functional areas FAC. In this circumstance, in addition to having the plurality of candidate functional areas FAC, the light emitting layer of the touchpad 22 may also have a plurality of light-permeable the plurality of patterns I, and the orthographic projections of the patterns I on the transparent surface of the touchpad 22 are located in the candidate functional areas FAC and respectively overlap the plurality of predetermined coordinate sets. Therefore, the touch system with handwriting function of the third embodiment may perform the same processes as the above-mentioned two embodiments, such as the floating operation. In addition, the touch system with handwriting function of the third embodiment may perform selecting a functional area FA from the candidate functional areas FAC by the touchpad 22 after receiving a switching signal (as described in the second embodiment) and emitting the first light and the second light by the light emitting element as described in the first embodiment. Those processes have been described in detail in the above two embodiments and are not described repeatedly herein. The patterns in the candidate functional areas FAC of FIG. 8 are drawn with dotted lines to shown an example of the patterns not being visible on the surface of the touchpad 22 since no light is projected toward the patterns.

In view of the above description, the touch system with handwriting function and operating method thereof according to an embodiment of the present disclosure provide a touch system integrating general finger touch function and stylus function. When the touchpad of the touch system receives the beacon signal emitted by the stylus device, the surface of the touchpad is divided into the functional area and the writing area. Moreover, when the selected pattern of the functional area is touched, the touchpad generates and outputs the control signal corresponding to the selected pattern. According to the above description, the present disclosure allows users to use a touch system with both the handwriting mode and touch mode with a lower cost.

What is claimed is:

1. An operation method of touch system with handwriting function, adapted to a touch system comprising a stylus device and a touchpad, wherein a surface of the touchpad is divided into a functional area and a writing area not overlapping with each other, the functional area has a coordinate set, and the operation method of touch system with handwriting function comprises:
    sending a beacon signal by the stylus device;
    receiving the beacon signal by the touchpad;
    emitting a first light with a first optical characteristic toward the surface by a light emitting element in a light emitting layer of the touchpad when signal strength of the beacon signal received by the touchpad is greater than a threshold, wherein the first light penetrates a pattern which is light-permeable of the light emitting layer, and an orthographic projection of the pattern on the surface overlaps the coordinate set;
    identifying, by the touchpad, a touched position on the surface when the touchpad is touched; and
    when the touched position falls in the coordinate set, changing the first light emitted to the pattern by the light emitting element into a second light having a second optical characteristic, and generating and outputting a control signal related to the coordinate set by the touchpad.

2. The operation method of touch system with handwriting function according to claim 1, wherein the touchpad further comprises a plurality of candidate functional areas, and before emitting the first light toward the surface by the light emitting element of the touchpad, the operation method of touch system with handwriting function further comprises:
    selecting one of the plurality of candidate functional areas as the functional area according to a switching signal by the touchpad.

3. The operation method of touch system with handwriting function according to claim 1, wherein when the signal strength of the beacon signal received by the touchpad is greater than the threshold, the operation method of touch system with handwriting function further comprises:

identifying a floating position of the surface associated with the beacon signal by the touchpad and generating a floating coordinate information according to the floating position, wherein the floating position is a position of the surface with a strongest signal corresponding to the beacon signal; and outputting the floating coordinate information by the touchpad when the floating position falls in the writing area.

4. An operation method of touch system with handwriting function, adapted to a touch system comprising a stylus device and a touchpad, wherein a surface of the touchpad has a plurality of candidate functional areas, each of the plurality of candidate functional areas has a coordinate set, and the operation method of touch system with handwriting function comprises:

sending a beacon signal by the stylus device;

receiving the beacon signal by the touchpad;

selecting one of the plurality of candidate functional areas as a functional area according to a switching signal by the touchpad;

dividing the surface of the touchpad into the functional area and a writing area which are not overlapping with each other when signal strength of the beacon signal received by the touchpad is greater than a threshold;

identifying, by the touchpad, a touched position on the surface when the touchpad is touched; and generating and outputting a control signal related to the coordinate set by the touchpad, when the touched position falls in the coordinate set of the functional area.

5. The operation method of touch system with handwriting function according to claim 4, wherein the touchpad further comprises a light emitting layer, the light emitting layer has a plurality of light emitting elements, a surface of the light emitting layer has a plurality of patterns that are light-permeable, the plurality of light emitting elements correspond to the plurality of patterns respectively, a plurality of orthographic projections of the plurality of patterns on the surface of the touchpad respectively overlap the plurality of coordinate sets of the plurality of candidate functional areas, wherein after dividing the surface of the touchpad into the functional area and the writing area, the operation method of touch system with handwriting function further comprises:

emitting a first light with a first optical characteristic penetrating the pattern of the functional area by the light emitting elements.

6. The operation method of touch system with handwriting function according to claim 5, wherein when the touched position falls in the coordinate set of the functional area, the operation method of touch system with handwriting function further comprises:

changing the first light emitted to the pattern by the light emitting element into a second light having a second optical characteristic.

7. The operation method of touch system with handwriting function according to claim 4, wherein after dividing the surface of the touchpad into the functional area and the writing area, the operation method of touch system with handwriting function further comprises:

identifying a floating position of the surface associated with the beacon signal by the touchpad and generating a floating coordinate information according to the floating position, wherein the floating position is a position of the surface with a strongest signal corresponding to the beacon signal; and outputting the floating coordinate information by the touchpad when the floating position falls in the writing area.

8. A touch system comprising:

a stylus device configured to output a beacon signal; and a touchpad in communication connection with the stylus device, wherein the touchpad comprises a light emitting layer, the light emitting layer comprises a light emitting element, a surface of the touchpad is divided into a functional area and a writing area not overlapping with each other, wherein the functional area has a coordinate set, a surface of the light emitting layer has a pattern which is light-permeable, an orthographic projection of the pattern on the surface of the touchpad overlaps the coordinate set, wherein when signal strength of the beacon signal received by the touchpad is greater than a threshold, the light-emitting element emits a first light with a first optical characteristic toward the surface of the touchpad, the first light penetrates the pattern, and when the touchpad identifies a touched position falls in the coordinate set, the touchpad changes the first light emitted to the pattern by the light-emitting element into a second light having a second optical characteristic, and generates and outputs a control signal related to the coordinate set.

9. The touch system according to claim 8, wherein the touchpad further comprises a plurality of candidate functional areas, each of the plurality of candidate functional areas has a coordinate set, the light emitting layer further comprises a plurality light emitting elements, the surface of the light emitting layer has a plurality of patterns, the plurality of light emitting elements correspond to the plurality of patterns respectively, an orthogonal projections of the plurality of patterns on the touchpad respectively overlap the coordinate sets of the plurality of candidate functional areas, wherein the touchpad further selects one of the plurality of candidate functional areas as the functional area according to a switching signal.

10. The touch system according to claim 8, wherein the touchpad is further configured to identify a floating position of the surface of the touchpad associated with the beacon signal and generate a floating coordinate information according to the floating position, wherein the floating position is a position of the surface of the touchpad with a strongest signal corresponding to the beacon signal, and the touchpad generates and outputs the floating coordinate information when the floating position falls in the writing area.

* * * * *